United States Patent
Kling et al.

(10) Patent No.: US 9,811,251 B2
(45) Date of Patent: Nov. 7, 2017

(54) GRAPHICAL USER INTERFACE SYSTEMS AND METHODS FOR DATA INTEGRATION WITH DATA-DRIVEN ENGINEERING DRAWINGS

(71) Applicant: Environmental Intellect, LLC, Cheyenne, WY (US)

(72) Inventors: Shane Edward Kling, Orlando, FL (US); Jess Michael Askey, Fort Collins, CO (US)

(73) Assignee: Environmental Intellect, LLC, Cheyenne, WY (US)

( * ) Notice: Subject to any disclaimer, the term of this patent is extended or adjusted under 35 U.S.C. 154(b) by 355 days.

(21) Appl. No.: 14/594,102

(22) Filed: Jan. 10, 2015

(65) Prior Publication Data

US 2016/0085418 A1    Mar. 24, 2016

Related U.S. Application Data

(60) Provisional application No. 62/054,194, filed on Sep. 23, 2014, provisional application No. 62/101,689, filed on Jan. 9, 2015.

(51) Int. Cl.
*G06F 3/048* (2013.01)
*G06F 3/0484* (2013.01)
*G06F 17/30* (2006.01)

(52) U.S. Cl.
CPC .... *G06F 3/04842* (2013.01); *G06F 17/30557* (2013.01)

(58) Field of Classification Search
CPC ................... G06F 3/04842; G06F 17/30557
See application file for complete search history.

(56) References Cited

U.S. PATENT DOCUMENTS

| | | | |
|---|---|---|---|
| 7,167,864 B1* | 1/2007 | Vasudevan | |
| 7,949,422 B1* | 5/2011 | Little | G05B 19/409 700/17 |
| 8,748,677 B2 | 6/2014 | Buchanan | |
| 9,501,375 B2* | 11/2016 | Frenz | H04L 67/06 |
| 2002/0026385 A1* | 2/2002 | McCloskey | G06F 17/50 705/26.8 |
| 2004/0024662 A1* | 2/2004 | Gray | G06Q 10/06 705/29 |
| 2004/0187095 A1 | 9/2004 | Gilfix et al. | |
| 2006/0048127 A1 | 3/2006 | Smith et al. | |

(Continued)

*Primary Examiner* — Omar Abdul-Ali

(74) *Attorney, Agent, or Firm* — MacMillan, Sobanski & Todd, LLC

(57) ABSTRACT

Described is a system and methodology, in which information is exchanged and/or updated within data-driven engineering schematics and various data management systems within an operating facility. The integration of plant data management systems with data-driven engineering schematics, such as piping and instrumentation diagram (P&ID), process flow diagrams (PFDs) and isometric drawings is an innovation that provides numerous benefits to multiple plant disciplines, including but not limited to Engineering, Operations, Maintenance, Procurement, Environmental, and Safety personnel. In addition to data exchange, described methods and systems within the graphical user interface are capable of generating alerts and initiating to changes to resolve data inconsistencies for a particular component represented in two or more data systems.

15 Claims, 6 Drawing Sheets

(56) References Cited

U.S. PATENT DOCUMENTS

| | | | |
|---|---|---|---|
| 2006/0190116 A1* | 8/2006 | Almeida | G06F 17/50 700/102 |
| 2007/0067779 A1 | 3/2007 | Gilfix et al. | |
| 2007/0237361 A1 | 10/2007 | Sandor et al. | |
| 2007/0288207 A1 | 12/2007 | Backe et al. | |
| 2008/0222611 A1 | 9/2008 | Sharma | |
| 2009/0276757 A1 | 11/2009 | Lindvall et al. | |
| 2010/0131903 A1* | 5/2010 | Thomson | G06F 8/38 715/847 |
| 2011/0055093 A1 | 3/2011 | Kling et al. | |
| 2011/0214091 A1* | 9/2011 | Nicol | G06F 3/0482 715/838 |
| 2011/0276160 A1 | 11/2011 | Kelly et al. | |
| 2014/0108353 A1 | 4/2014 | Awe et al. | |
| 2015/0161301 A1* | 6/2015 | Begur | G06F 17/5086 716/105 |

\* cited by examiner

GRAPHICAL USER INTERFACE SYSTEMS AND METHODS FOR DATA INTEGRATION WITH DATA-DRIVEN ENGINEERING DRAWINGS

CROSS-REFERENCE TO RELATED APPLICATIONS

This application claims the benefit of application Ser. No. 62/054,194, filed Sep. 23, 2014, and application Ser. No. 62/101,689, filed Jan. 9, 2015, both of which are herein incorporated by reference in the entirety.

BACKGROUND

Operating facilities have a need for a system and process for exchanging and updating data and relationships within data-driven schematics and various data management systems within an operating facility. There is a need for integration of plant data management systems with data-driven schematics, such as piping and instrumentation diagram (P&ID), process flow diagrams (PFDs) and isometric drawings. A graphical user interface to support such plant data management is particularly challenging, as numerous plant disciplines are involved and are accustomed to applications that are customized to meet specific, disciplinary needs.

Historically, plant operations have been separated into several professional disciplines with employees who offer specific expertise and focus to achieve operational safety, regulatory compliance and profitability. The systems and processes that collect data and information relating to various plant disciplines have been inherently disconnected from one to the other because of separation in responsibilities. Furthermore, each plant discipline has, over time, implemented systems and tools, both hard-copy and electronic, to fulfill discipline-specific objectives and data collection, as well as to communicate requirements that impact other plant disciplines. As electronic data collection systems have improved in both functionality and speed, operating plants have implemented technology initiatives to improve data collection, reporting, and sharing amongst plant disciplines.

For example, several operating facilities have implemented enterprise asset management (EAM) systems, such as SAP®, which have both integrated software and consolidated data applications that become obsolete when data is electronically integrated. Although SAP® may collect data from various sources and can be configured to perform calculations and generate reports, it is not designed to both share and update between a transmitting and receiving database. Accordingly, the graphical user interface (GUI) for an EAM system is generally an application-specific portal that enables users to log-in, view, and generate computational calculations and reports. That is, there is no common user interface to access data stored in an EAM system other than within the "front-end" of the EAM application itself. The standard data model for plants who have implemented an EAM causes challenges to plant disciplines who infrequently use SAP® because the information contained within SAP® is only viewable to plant disciplines from the application-specific "front-end."

This lack of integration and interoperability is particularly problematic for plant disciplines having responsibilities that impact another department, or which have been impacted by another department.

For example, a plant engineer who is responding to a catastrophic emergency will have several responsibilities after the emergency to perform a root cause analysis as well as make recommendations to prevent a similar occurrence in the future. To properly perform such root cause analyses, a plant engineer will identify a specific location within the process where the catastrophic emergency occurred by utilizing plant schematic diagrams, such as a piping and instrumentation drawing (P&ID), typically formatted in a computer-aided design (CAD) format, such as AutoCAD®. After the process location has been identified, including specific equipment, pipes, and instrumentation (i.e., transmitters of temperature, pressure, and flow measurements), then the engineer will utilize a separate and distinct application, referred to as a process data historian, typically formatted in a database and exportable to Microsoft Excel™, in order to query data in the vicinity of the affected equipment. Analysis of the queried data is then typically compared against another dataset of design parameters, which are housed in another distinct application, typical formats include a variety of hard-copy paper and electronic documents in various databases. If analysis of operating and design data provides insufficient details to perform the root cause analysis, then the plant engineer may inquire with numerous, other plant disciplines to obtain other data including but not limited to operating procedures, inspection, monitoring, and maintenance repair data. It is commonplace in the industry to have separate and distinct databases that manage inspection, monitoring, maintenance repair, and other relevant datasets.

The overarching challenges presented by facility systems in the above example are two-fold: First, how can data collected within a single plant data system, which is separate and distinct from any other, be shared amongst multiple plant disciplines in both "read" and "write" format? Second, what type of GUI can be employed to logically present data that, in its standard format, is limited to being viewed from within each application-specific "front-end." These issues are not mutually exclusive; that is, to provide a solution to one or the other does not provide an adequate technical basis for solving the challenge of enabling data integration amongst many plant disciplines within an operational plant environment.

SUMMARY OF THE INVENTION

Described is a system and methodology, in which operating facility information is presented, exchanged, and updated within data-driven schematics and data management systems. The integration of plant data management systems with data-driven schematics, such as piping and instrumentation diagram (P&ID), process flow diagrams (PFDs) and isometric drawings, is an innovation that provides numerous benefits to multiple plant disciplines, including but not limited to Engineering, Operations, Maintenance, Instrumentation and Electrical, Procurement, Environmental, Safety, Industrial Hygiene, and Management personnel. In addition to data exchange, the system is capable of generating alerts when inequivalent properties are detected for objects in a relational database of a data-driven schematic and at least one data management system.

Provided is a methodology in which data stored in a plurality of databases can be shared amongst plant disciplines and accessed with read and/or write privileges, as well as to provide a common graphical user interface from an enhancement to plant schematics in which data shared and accessed is presented.

Detailed plant schematics, such as P&IDs, contain a reference library of most, if not all, equipment designed, installed, and operated in a plant. Multiple plant disciplines utilize detailed schematics in their daily workflow to fulfill various objectives related to their job; therefore, these schematics are familiar to most plant personnel across disciplines.

However, plant schematics in their common, present-day format (e.g., AutoCAD® or Microstation®) have limited data object orientation; thus, detailed schematics have been limited in their use and application because there are inherent limitations to import and export data from plant schematics in their common, present-day format. For this reason, plant schematics have offered plant personnel little more than a visual representation of a process akin to a digital photograph, which has limited how plant schematics have been traditionally utilized. Methods described herein enable the detailed plant schematics, such as P&IDs, to provide a graphical user interface within an interactive data-driven schematic for data analysis, display, control, and information exchange.

Embodiments of the methods provide a facility control and display system comprising: retrieving data from at least two data management systems, wherein the data management systems are selected from the group consisting of: a relational database of a computer aided design data storage system, as well as an enterprise asset management system, a document management system, a process information system, an inventory management system, a financial system, a maintenance and repair data system, an environmental compliance system, a safety inspection system, or a process data historian; launching a graphical user interface within a data-driven engineering drawing, wherein the graphical user interface corresponds to the graphical representation of retrieved data for selectable objects; presenting selectable objects within the graphical user interface; retrieving object-specific data from at least one data management system upon receiving a user-generated object selection in the data-driven engineering drawing; correlating a set of object data in the relational database with the retrieved selected-object data from the data management system using a unique identifier; displaying the retrieved selected-object data in the graphical user interface; initiating a data change for the selected object to at least one of: the set of object data in the relational database or object-specific data in the data management system, upon receiving a user command in the graphical user interface.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Described methods and systems apply to operating plants in a number of industries, including but not limited to energy, manufacturing, and processing, where facility schematics have been developed to either design, construct, and/or maintain the equipment comprising the operating plant. Computer Aided Design (CAD) and drafting tools are used by architects, engineers, and designers to create precision models, schematics, and technical illustrations.

Schematics refer to facility diagrams, including but not limited to Piping and Instrumentation Diagrams (P&IDs), Process Flow Diagrams (PFDs), or isometric drawings, which represent a plurality of physical objects (pipes, vessels, equipment, etc.) within a commercial manufacturing operation. A data-driven schematic further includes a relational database in a native format within the architecture of the CAD environment to associate and store characteristics of the plurality of objects.

Data-driven schematics are commonly referred to as "smart CAD" applications, which have existed in the earliest format dating back to the 1970s. Present-day "smart CAD" applications include, for example, Intergraph SmartPlant® P&ID, Autodesk AutoCAD P&ID™, Bentley AutoPLANT®, and CADWorx®.

Operating plants generally utilize multiple data systems amongst plant disciplines, such as for Engineering, Maintenance, Operations, Instrumentation and Electrical, Procurement, Environmental, Safety, Industrial Hygiene, and Management tasks, which are not natively integrated with one another. Nearly all plant disciplines utilize plant schematics to fulfill specific responsibilities related to the role served within the operating plant.

Some enterprise-wide asset management systems, such as SAP® have been developed in order to integrate data from various data applications and eliminate inefficiencies associated with managing multiple, standalone databases by offering management of the various data applications in a single user interface.

However, existing asset management systems, such as SAP®, lack the ability to associate data with equipment objects within a data-driven schematic. For example, SAP® is limited to storing a static, non-data driven, file of a CAD schematic for reference purposes only. Existing asset management systems, such as SAP®, do not provide functionality for integrating data systems with data-driven schematics.

Because operating plants manage a variety of software and data collection systems that are not designed to exchange and view data between independent systems, numerous inefficiencies can be observed within inter-disciplinary workflow, communication, record-keeping and reporting. Furthermore, data inaccuracies are common for specific equipment within an operating plant because of the lack of integration between inter-disciplinary software and data collection systems.

Figure 1:
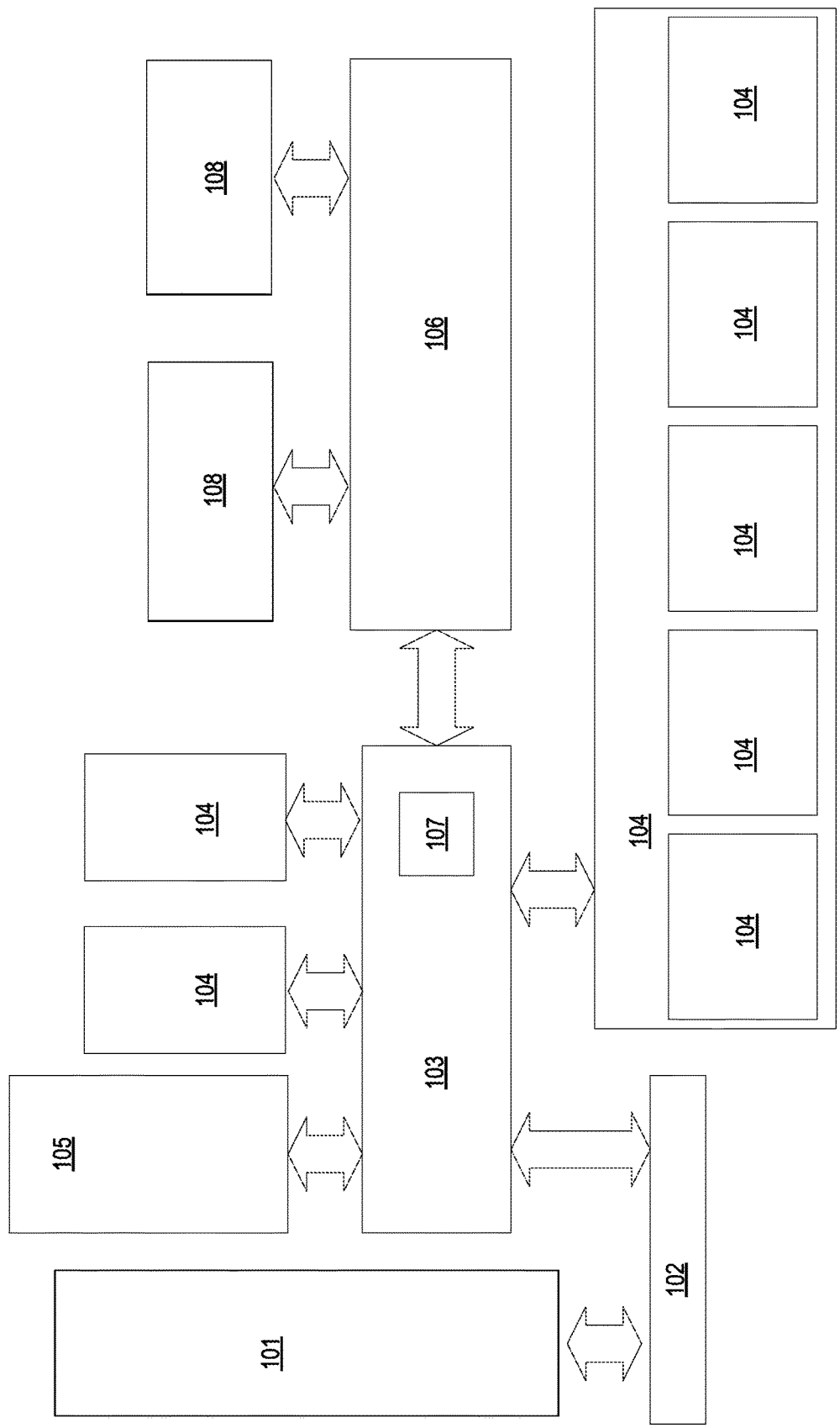
FIG. 1. Software User-Architecture Overview.

Turning now to the figures, FIG. 1 shows an exemplary process flow of a data display for the interactive schematic graphical user interface (GUI) for an embodiment of a data control and integration system. Shown is an example of a data flow diagram of an overview of a system integrating data from external plant databases to objects within a data-driven schematic.

Within FIG. 1, the data-driven schematic interface 101 is the front-end of the data-driven CAD environment, where the user can create, edit, and delete CAD objects. Data from the underlying CAD database 102 can be queried and provides a user interface to view and edit properties of equipment objects in the schematic.

The CAD database 102 provides a data repository for equipment objects, as well as the properties of the objects in the data-driven schematic or isometric drawing. The equipment naming convention in the CAD database 102 provides a unique identifier (UID) 107 used to search within facility databases 104, external to the CAD database, and identify data for matching equipment for import and export by the core engine 103. Individual facility databases 104 may be located on the same server, a different server, in a distributed system, in a cloud system and the like. The methodology includes identification of a specific data identifier, the UID 107, present within the CAD database 102, which represents a unique engineering item in the dataset of engineering data objects.

The core engine 103 is a logic engine that utilizes a connection string from the CAD database 102 to external plant databases 104 in order to import/export data. The core engine 103 searches in the systems to be integrated by a predefined UID 107, and the core engine 103 can then exchange data using numerous algorithms to allow for read and/or write access to data in either system from within the data-driven schematic interface 101.

The core engine 103 may provide a look-up table correlating the smart CAD UID 107 with unique identifiers in a multiplicity of databases. Using a look-up table, a unique identifier in a plant database 104 may be non-identical to the UID 107 in a smart CAD database 102, but may be mapped to a corresponding UID 107 by the core engine 103.

Plant databases 104 include plant software or data systems employed at an operating facility that houses information and/or data that can be integrating by cross-referencing UIDs 107 for equipment that are a match with the CAD database 102. External plant databases 104 accessed or modified by the core engine 103 may include an enterprise resource planning (ERP) tool, a supplemental computer aided design data storage system, an enterprise asset management system, a document management system, a process information system, an inventory management system, a financial system, a maintenance and repair data system, an environmental compliance system, a safety inspection system, a process data historian, a scheduling system, a track & trace audit system, a laboratory information management system (LIMS), a warehouse management system (WMS), a computerized maintenance management system (CMMS), a product lifecycle management (PLM) system, a customer relationship management (CRM) system, a human resource management (HRM) system, a process development execution system (PDES), and other databases storing process data, equipment status, material lot information and production logs. Examples of external plant databases 104 include but are not limited to: SAP®, Maximo, IMPAK, LeakDAS™, PI ProcessBook™, Aspen IP21™, and Documentum™.

The CAD-based server 105 is the interface to a server that allows for data from plant databases 104 to be viewed within the data-driven schematic interface 101. Plant data systems are integrated by the CAD-based integration server 105 and displayed within the data-driven schematic interface 101.

A network or web-based server 106 provides an intranet or web-based interface that facilitates the same data integration as in the CAD-based integration server 105 and provides a format that is accessible externally to the data-driven schematic interface 101. Any permitted user may utilize this platform to access, view, and/or edit data relayed through the core engine 103 from the external plant databases 104 to the data-driven schematics 101. A mobile device or remote terminal may also use a schematic interface, but the interface is different because the file format it typically changed to facilitate this interaction. For example, in one embodiment of a data-driven schematic interface 101, files have a .dwg file extension; however, the same drawing and isometric object relationship may be converted to a .dwf format to support viewing in an offline, intranet or web-based browser 108.

FIGS. 2-6 show exemplary simplified screen images of an embodiment of a system providing data control and integration of multiple databases in a schematic interface. The figures show a data-driven engineering drawing 200 in a smart CAD program 201 with an object display area 202. Depicted objects 210 may include process piping, streams, equipment, and the like. A display window or display area for retrieved data 213 is provided as a graphical user interface to view the data in graphical or tabular format.

Figure 2:
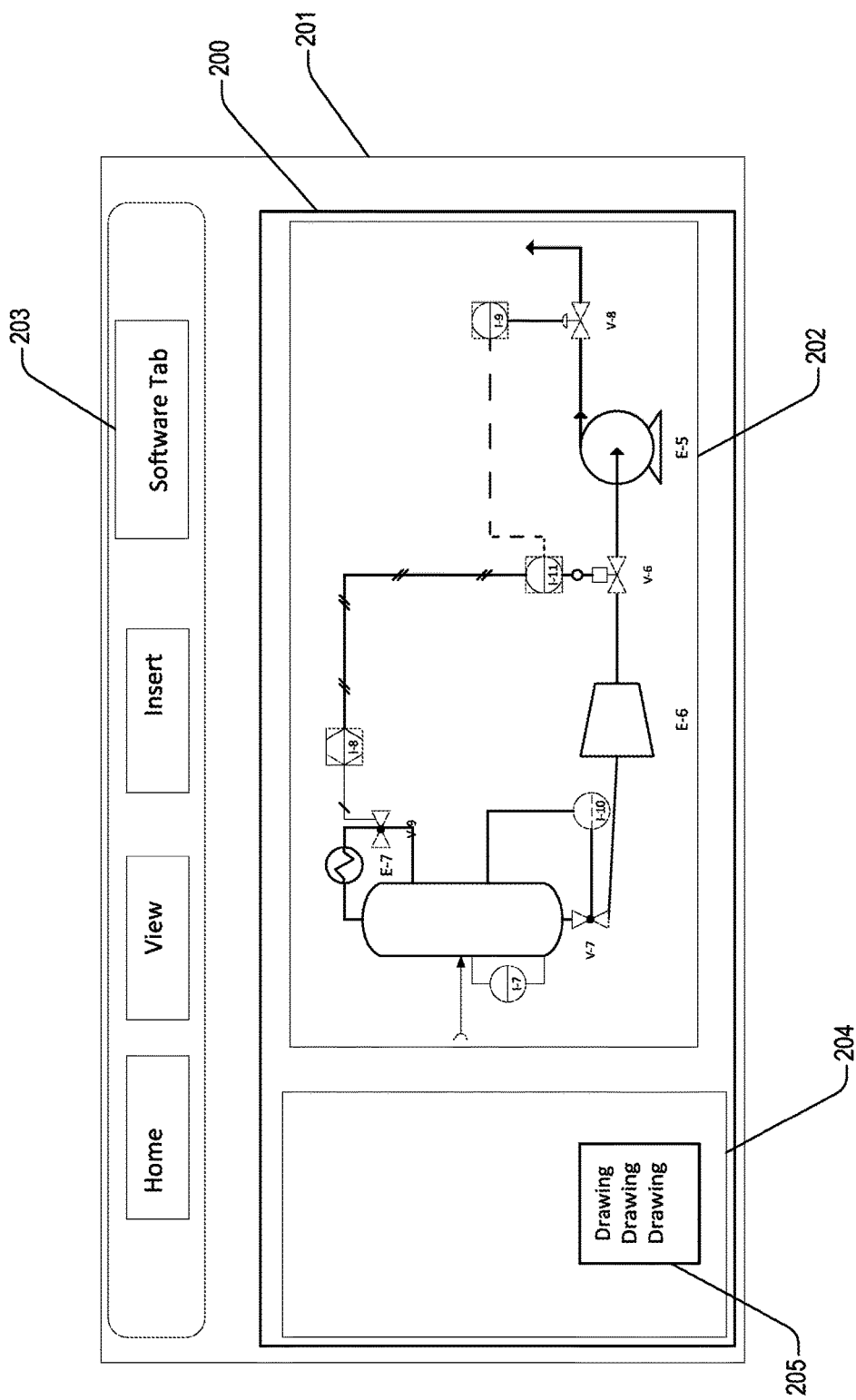
FIG. 2. Data-Driven Drawing with Schematic Layout.

FIG. 2 shows a schematic interface launch selection 203, a CAD storage system display 204 with a CAD files index 205, as well as an object display area 202.

Figure 3:
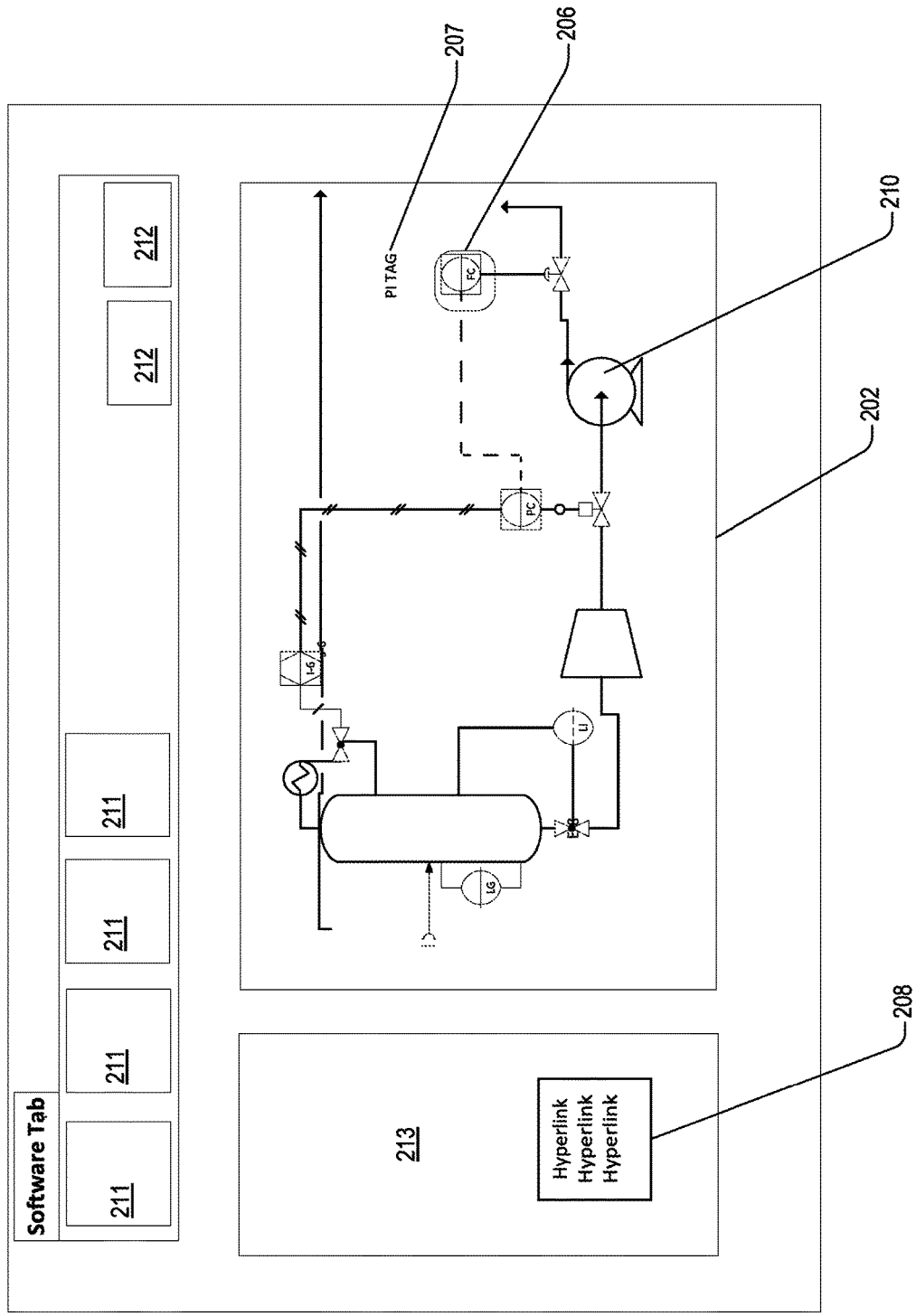
FIG. 3. Data Review of Process Data within Data-Driven Schematic.

FIG. 3 shows a menu bar with data integration modules 211 for selected databases and tools for navigation 212. Within a process information display area for retrieved data 213, hyperlinks 208 to pertinent data from plant data management systems and information are provided. Within the object display area 202, an identifier 207, such as an engineering process information tag may be shown. A clickable graphic, hot-spot, or equipment selection area 206 is provided for the selection of a particular object, such as a pump, vessel, gauge, sensor, pipe, valve, stream, or other equipment and process objects. Objects may also be selected by a menu, typed entry, or other non-graphical interface. As shown, a Process Information (PI) tag may be selected within the object display area 202 to view available data for that PI tag, such as the minimum, maximum and average values over a time range.

Figure 4:
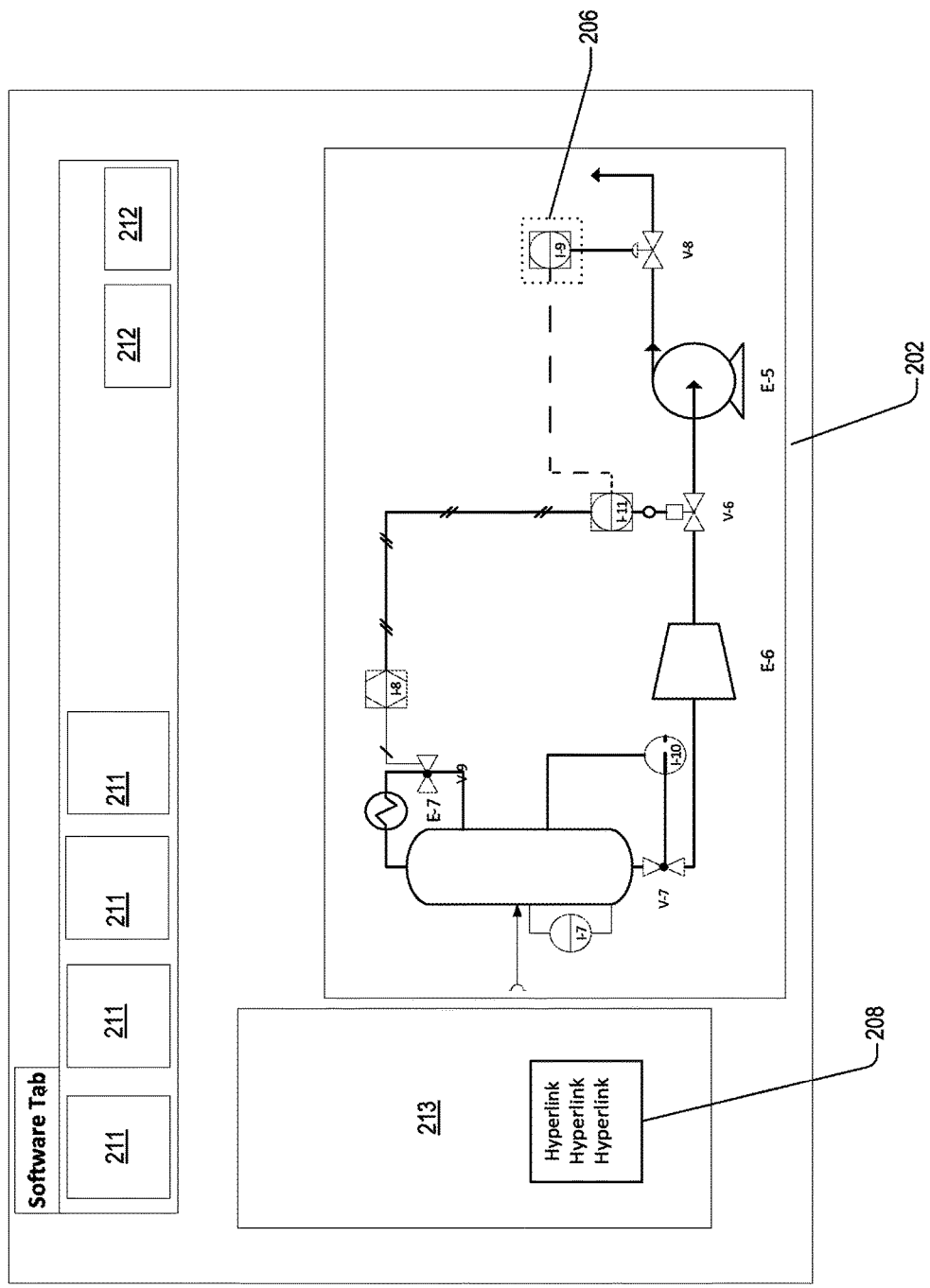
FIG. 4. Data Exchange with a Maintenance Management System.

FIG. 4 shows a schematic presenting data from a computerized maintenance management system on an interactive schematic with hyperlinks 208 to pertinent systems and information within the display area for retrieved data 213. A menu bar with data integration modules 211 for selected databases and tools for navigation 212 is also shown. A clickable graphic, hot-spot, or equipment selection area 206 is provided for the selection of a particular object, such as a pump, vessel, gauge, sensor, pipe, valve, stream, or other equipment and process objects.

Figure 5:
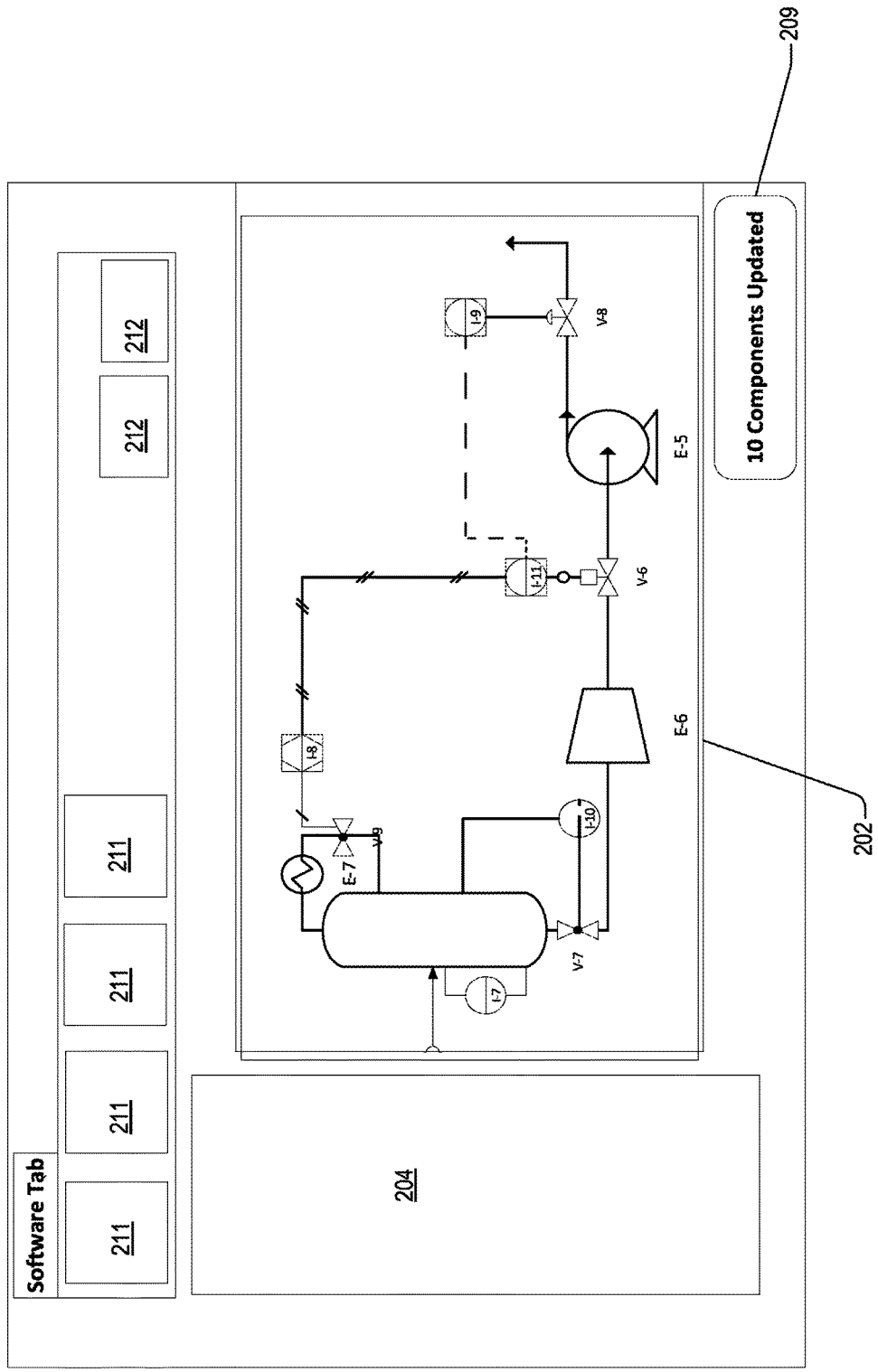
FIG. 5. Data Updating and Notification in Data-Driven Schematic.

FIG. 5 shows a data-driven schematic after a data exchange with, or update from, a data system and the interactive schematic. A notification or alert 209 provides notice that inequivalent or nonequivalent properties are present in the retrieved data from one or more databases in relation to the objects' properties in the computerized engineering drawing.

Figure 6:
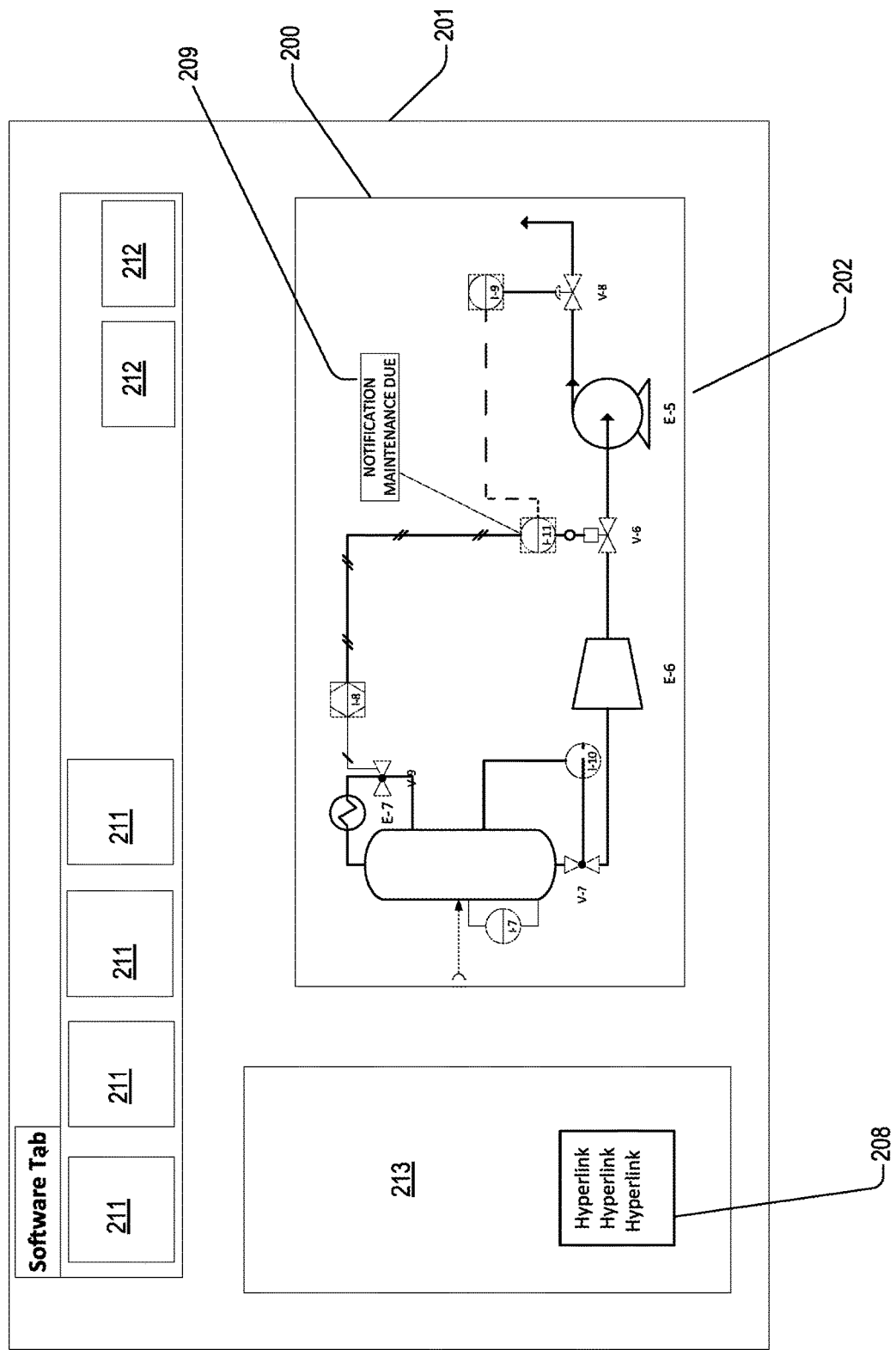
FIG. 6. Document Search and Review from within Data-Driven Schematic.

FIG. 6 shows a data-driven schematic linked to an electronic document management system. Hyperlinks 208 link to documentation and resources while a pop-up object-specific notice or alert 209 provides information on current status. In a one-way or two-way data update and exchange between an interactive data-driven schematic interface and an external database an equivalency check may be performed. A 'data alert' may also be shown within the interactive data-driven schematic interface if data for any equipment having a UID that has been updated in the corresponding computerized maintenance management system.

A sample data flow associated with an example of an end-user accessing data from a data-driven schematic interface includes the following steps.

In step 1, the user launches a data-driven schematic.

In step 2, the user executes command to access data for an external, plant database that has been integrated with data-driven schematic. For example, a command or selection of 'EiWO' launches work orders from a CMMS system.

In step 3, a visual interface allows the user to see data from an external database within the data-driven schematic user interface. The interface is enabled with a drill-down capability to search or view data globally within the schematic or for specific equipment or objects in schematic.

In step 4, the user can select specific equipment or objects within the CAD environment of the data-driven schematic to view information for that equipment or object retrieved from an external database.

In step 5, the user-selected data can be exported from within the data-driven schematic into various formats for additional analyses.

Numerous benefits can be achieved overall and with the utilization of specific systems by implementation of the described systems and methods.

There are several benefits that are realized system-wide. The data-driven schematic is utilized as a recognizable format from which the graphical user interface is launched to integrate a plurality of software and data collection systems. It enables data to be shared across plant disciplines seamlessly through a "data bridge" between data-driven schematic platform and virtually every other plant data management system used at facilities to drive workflow efficiency and long-term cost savings. It facilitates read and/or write data access within a data-driven schematic for properties of equipment linked by a unique identifier (UID) to an external database. It integrates with existing, operating plant data management systems and software packages, including but not limited to SAP®, PI ProcessBook™, IMPAK, Aspen InfoPlus.21, Maximo™, Documentum™, LeakDAS™, etc. Another benefit is achieving long-term cost savings by automating traditionally, inefficient data updating processes that may rely on independent updating of databases or hard-copy exchange of information.

The system uses a schematic that is in a data-driven format consisting of a plurality of data objects representing the symbols, lines, text, and objects comprised within the CAD drawing. The symbols, lines, text, and objects generally represent piping, equipment, and operating/design parameters associated with the process schematically represented by the data-driven schematic. Thus, another benefit is enabling data to be shared across plant disciplines seamlessly through a common schematic user interface that is familiar to all plant personnel.

There are several benefits that relate to enterprise asset management (EAM) integration. The system provides a platform for viewing multiple, current and historical work orders housed in an external plant database (such as, SAP® and Maximo) for equipment objects within data-driven schematic. While existing systems, such as SAP, Maximo, and EMPAQ have the ability to produce reports of historical and current work orders from that system, existing systems do not allow this information to be viewed and edited within a data-driven drawing, such as a schematic.

The system provides a user selectable data-driven schematic. By selecting a retrieved data link within the data-driven schematic, a specific work order can be launched to show a detailed view of work order information housed in an external plant database and to edit the work order data. The data-driven schematic presents timely alerts to prompt a user to view data updates executed in an external database and accept or reject the updates to object-specific data.

In one embodiment, the system provides for a comparison of equivalence in properties using a UID between the relational database of the data-driven schematic and at least one data management system. The data comparison can be executed on a user-triggered action to detect non-equivalent properties or at a defined frequency. The system is capable of alerting the user of non-equivalent properties and enables the user to initiate a data update to the relational database of the data-driven schematic or object-specific data in the data management system, upon receiving a user command in the graphical user interface. Further, upon changing of data in one or more external system, the user can initiate an immediate refresh which will start a process to compare data in real-time.

There are several benefits that relate to process data historian (PDH) integration wherein PDH data may be integrated with data-driven schematics based on programming logic that matches a UID for process information (PI) tags from the PDH database to a data-driven schematic. Within the graphical user interface, tabular and graphical displays are available of operating parameter data (e.g., temperature, pressure, flow, composition, etc.) may be viewed by searching and selecting process instrumentation. The system can provide functionality that includes using a user input (mouse cursor) to hover over a specific object (e.g., flow transmitter, pressure transmitter, level switch, etc.) in the data-driven schematic to see process data over a specified time frame (such as, current, 1-hour, 24-hours, 7 days, etc.) in a specified format (min, max, average, last 24 hours, etc.). Process information queried within a CAD environment may be exported into a specified format to facilitate troubleshooting in common data applications (MS Excel, XML, csv, txt). Alerts for process instrumentation operating out of range within a defined and or desired specification (e.g., operating pressure at a pressure transmitted exceeds maximum design pressure) can be presented and observed in a broader spatial, temporal, and process flow context.

There are several benefits that relate to electronic document management system (EDMS) integration. The system provides for launching an interface within the data-driven schematic environment to view documents associated with specific objects and equipment in the data-driven schematic. The system provides for selecting a link to a specific document within the interface and launching the default application to view and edit the file in its native format.

In addition to reviewing/updating data within the CAD environment, non-CAD users are able to utilize the embodiments of this invention within offline, intranet, and web-based, data-driven engineering drawing applications. The data-driven schematic may be exported into a format that is compatible with a host of viewing applications for access with a browser, terminal, or portable computing device, such as a tablet (i.e., iPad®, Microsoft Surface Pro™, etc.). Within a viewing application supported by a portable computing device, an end-user may identify data aspects of object-oriented equipment within the data-driven schematic. Further, the end-user may edit data for object-oriented equipment and/or insert additional data associated with said object-oriented equipment. Data edits and/or additions rendered from a viewing application within a portable computing device may then be translated into a common format (e.g., Comma Separated Values, or .csv file format) to allow for integration with external plant data management systems. Multiple devices can be used simultaneously.

An Application Program Interface (API) fits a standard model of software allowing data-driven schematics to interface with and exchange data with external plant data management systems. The API enables the creation of new data records, as well as the updating of existing data records within the external plant data management system. Conversely, the end-user can view data from the external plant data management system from within the data-driven schematic once a common equipment identifier has been defined within the viewing application of the portable computing device.

Embodiments of the present invention can be implemented on a software program for processing data through a computer system. The computer system used in implementation may include a personal computer, notebook computer, server computer, cloud computer, mainframe, networked computer, computer terminal, router, monitor, programmable logic controller (PLC), handheld computer, tablet, personal digital assistant, workstation, and the like. This program or its corresponding hardware implementation is operable for facility control and schematic display. In one embodiment, the computer system includes a processor coupled to a bus and memory storage coupled to the bus. The memory storage can be volatile or non-volatile and can include removable storage media. The computer can also include a display, provision for data input and output, and other features.

In some embodiments, described methods and systems are implemented in a petroleum refining facility. In a petroleum refining facility, hydrocarbons are processed to produce fuel. The term, hydrocarbon, refers to any linear, branched, or cyclic molecule, aliphatic or aromatic, saturated or unsaturated, composed primarily of hydrogen and carbon. Mixed hydrocarbons refers to a mixture of two or more hydrocarbon species, including mixtures of C3-C8 straight and branched hydrocarbons, butane and pentane, mixtures of n-pentane and isopentane, and mixtures of butane, n-pentane and isopentane. The term, fuel, refers to any refined combustible petroleum product that flows through a petroleum pipeline. The term includes any liquid that can be used as fuel in an internal combustion engine, with or without addition of ethanol. The term includes products that consist mostly of aliphatic components, as well as products that contain aromatic components and branched hydrocarbons such as iso-octane. The term thus includes all grades of conventional gasoline, reformulated gasoline ("RFG"), diesel fuel, biodiesel fuel, jet fuel, heating oil, kerosene, and transmix. The term also includes blendstock for oxygenate blending ("BOB"), which is typically used for blending with ethanol. BOBs include RBOB (reformulated gasoline blendstock), PBOB (premium gasoline blendstock), CBOB (conventional gasoline blendstock), subgrade gasoline, and any other blendstock used for oxygenate or ethanol blending.

Methods, systems and computer program products are described for providing a computer-implemented facility engineering data control and display system for a facility comprising a plurality of process streams. In an aspect, a system comprises a data-driven computerized document configured for receiving data from a plurality of design documents, engineering drawings, maintenance records, change control documents, and other documents associated with an operating facility and its process streams. The system provides for rendering an integrated design document. The system also includes an input-receiving component and a data extraction component configured for automatically extracting design data from the design documents, engineering drawings, maintenance records, change control documents, and other documents associated with the operating facility and its process streams.

In another aspect, a method for providing a computer-implemented data control system for an automated system comprises receiving, by a document receiving component, a plurality of design documents associated with an automated system, engineering drawings, maintenance records, change control documents, and other documents associated with an operating facility and its process streams, and rendering an integrated data-driven engineering drawing, wherein the data from the plurality of source documents is related to the objects within the relational database of the data-driven engineering drawing, determining by matching a unique identifier (UID) a relationship between the data from each of the plurality of documents and storing by a data manager component the relationship in a database accessible by the computer-implemented data control system, wherein the computer implemented control system manages the plurality of systems in the operating facility and its process streams in the automated system based on the relationships stored in the database.

The software solution interacts directly with the plant data management system (such as a "smart CAD" drawing) and within the software, the relationships (being either one-to-one or one-to-many) between the data-driven engineering drawings are defined by the user. Using a connectivity, internal mapping engine of components located on a detailed data-driven schematic (e.g., P&ID) and a summary data-driven schematic (e.g., process flow diagram, or P&ID), a relationship is defined which allows translating of properties between the PFD and P&ID. An example would be mapping of a stream, or chemical species, property from a PFD down to one or more P&ID drawings, whereas when the 'Stream' property is updated in the PFD, then the associated property on the corresponding P&ID(s) can also be updated.

Data available to the user through the graphical user interface may also be exported to a structured data file such as CSV, XML, JSON, XLS, etc. for disconnected storage, and then at any point re-imported to set the correct property values upon either the PFD or P&ID drawings or components within those drawings. Additionally, there exists user software tools that allow importing of these properties directly from external data systems, such as from a process simulation model or laboratory information management system (LIMS) for chemical species data, so that upon a scheduled term or on a user-based trigger, the data may be imported or exported to that system.

Within a plant data management system, the schematic representation comprises of physical piping which transfers utility and chemical components making up a stream to and from equipment. These components are schematically represented in the PFD and P&ID drawings. They are related by connectivity, flow directions and also include both physical properties such as Size, Manufacturer, Temperature, Pressure but also additional information such as regulatory determinations, safety history, and relationships to other components.

The software solution functions as a "data bridge" through which a graphical user interface within the data-driven engineering drawing provides a plant data management system that integrates the many software data systems in use at operating plants. The "data bridge" application uses a UID relationship map in order to programmatically link components between the relational database of the data-driven engineering drawing and at least one plant data management system. The relationship can comprise of one-to-one, one-to-many or many-to-many, in correlating objects from the relational database of the data-driven engineering drawing to at least one data management system.

The software solution is presentable by a desktop computer application, offline viewing application within a portable computing device, or via web-based internet browser connected to a web application comprising of the same internal features mentioned above. Both of these interfaces by using the "data bridge" are then able to leverage the UID mapping engine, PFD to P&ID hierarchy definitions and connectivity to schematic component information and additionally show data points and properties from one or more external data systems.

While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments.

What is claimed is:

1. A method of providing a facility graphical user interface system for data control and display comprising:
   providing a data-driven engineering drawing, comprising:
      a graphical representation of objects in a facility system, and
      a relational database of the objects, wherein each object has a unique identifier;
   launching a graphical user interface within the data-driven engineering drawing, wherein the graphical user interface corresponds to the graphical representation and further comprises retrieved data for a set of selectable objects;
   presenting the set of selectable objects within the graphical user interface;
   accessing, in the graphical user interface, process stream data elements correlating to at least one pipe, wherein the process stream data elements comprise a plurality of material handling properties associated with a plurality of chemical constituents of a process stream;
   retrieving object-specific data from at least one data management system upon receiving a user-generated selection of a selected object in the data-driven engineering drawing;
   correlating a set of object data in the relational database with the object-specific data retrieved from the at least one data management system using the unique identifier;
   displaying the object-specific data in the graphical user interface; and
   initiating, upon receiving a user command in the graphical user interface, a data change for the selected object to at least one of: the set of object data in the relational database or object-specific data in the at least one data management system.

2. The method of claim 1, wherein objects of the data-driven engineering drawing comprise properties of process piping, streams, equipment, text, and symbols associated with a manufacturing process.

3. The method of claim 1, further comprising:
   executing an algorithm to detect inequivalent properties for the selected object in the relational database as compared with properties for the selected object in the at least one data management system at least one of the data management systems.

4. The method of claim 1, further comprising:
   executing an algorithm to detect inequivalent properties for the selected object in the relational database as compared with properties for the selected object in the at least one data management system, wherein an absence of a property is not inequivalent; and
   generating an alarm if an inequivalent data property is detected for the specified object.

5. The method of claim 1, further comprising:
   executing an algorithm to detect inequivalent properties for a specified object in the relational database as compared with properties for the specified object in the at least one data management system, wherein an absence of a property is not inequivalent; and
   propagating the initiated data change from the graphical user interface, if an inequivalent data property is not detected for the specified object, to at least one of the relational database or the at least one data management system.

6. The method of claim 1, wherein the at least one data management system is selected from the group consisting of: an enterprise asset management system, a document management system, a distributed control system, an inventory management system, a financial system, an operational data system, an instrumentation and electrical data system, a maintenance and repair data system, an environmental compliance system, a safety compliance system, and a process data historian.

7. The method of claim 1, wherein the retrieving data step further comprises, retrieving data from at least two data management systems selected from the group consisting of: an enterprise asset management system, a document management system, a distributed control system, an inventory management system, a financial system, an operational data system, an instrumentation and electrical data system, a maintenance and repair data system, an environmental compliance system, a safety compliance system, and a process data historian.

8. The method of claim 1 further comprising:
   linking to at least one data management system within the graphical user interface, such that a user selection of a hyperlink, in the graphical user interface, launches a session in a native format of the data management system.

9. The method of claim 1, further comprising:
   presenting retrieved data, wherein the retrieved data comprises process data for the selected object over a user-specified timeframe.

10. The method of claim 1, further comprising:
    monitoring and analyzing retrieved data for detection of data values exceeding a user-defined range bounded by a maximum value and a minimum value; and
    generating an alert if the detected data values exceed the user-defined range.

11. A computer implemented graphical user interface system for facility data control and display comprising:
    a data-driven engineering drawing, comprising:
       a graphical representation of objects in a facility system, and
       a relational database of the objects, wherein each object has a unique identifier;
    a graphical user interface comprising a set of selectable objects, wherein the graphical user interface corresponds to the graphical;
    process stream data elements represented in the graphical user interface, wherein the process stream data elements correlate to at least one pipe, and wherein the process stream data elements comprise a plurality of material handling properties associated with a plurality of chemical constituents of a process stream;

object-specific data retrieved from at least one data management system, wherein the object-specific data is retrieved upon receiving a user-generated selection of a selected object in the graphical user interface; and an integration module correlating a set of object data to the relational database with the retrieved object-specific data from the at least one data management system using the unique identifier, and wherein the retrieved object-specific data is displayed in the graphical user interface; and wherein, upon receiving a user command in the graphical user interface, the integration module initiates a data change corresponding to the selected object in at least one of: the set of object data in the relational database or object-specific data in the at least one data management system.

12. A non-transitory computer readable medium containing program instructions for causing a computer to perform the method of:

accessing a data-driven engineering drawing, comprising:
a graphical representation of objects in a facility system, and
a relational database of the objects, wherein each object has a unique identifier;

launching a graphical user interface, wherein the graphical user interface corresponds to the graphical representation;

presenting a set of selectable objects within the graphical user interface;

accessing, in the graphical user interface, process stream data elements correlating to at least one pipe, wherein the process stream data elements comprise a plurality of material handling properties associated with a plurality of chemical constituents of a process stream;

retrieving object-specific data from at least one data management system upon receiving a user-generated selection of a selected object in the graphical user interface;

correlating a set of object data in the relational database with the object-specific data retrieved from the at least one data management system using the unique identifier;

displaying the object-specific data in the graphical user interface; and initiating, upon receiving a user command in the graphical user interface, a data change for the selected object to at least one of: the set of object data in the relational database or object-specific data in the at least one data management system.

13. A method of providing a facility graphical user interface system for data control and display comprising:

providing a data-driven engineering drawing, comprising:
a graphical representation of objects in a facility system, and
a relational database of the objects, wherein each object has a unique identifier;

launching a graphical user interface within the data-driven engineering drawing, wherein the graphical user interface corresponds to the graphical representation and further comprises retrieved data for a set of selectable objects;

presenting the set of selectable objects within the graphical user interface;

retrieving object-specific data from at least one data management system upon receiving, in the data-driven engineering drawing, a user-generated selection of a selected object and a user-specified timeframe;

correlating a set of object data in the relational database with the retrieved object-specific data from the at least one data management system using the unique identifier;

displaying the retrieved object-specific data in the graphical user interface, wherein the retrieved object-specific data comprises process data for the selected object for the user-specified timeframe; and initiating, upon receiving a user command in the graphical user interface, a data change for the selected object to at least one of: the set of object data in the relational database or the object-specific data in the at least one data management system.

14. The method of claim 13, further comprising:
accessing, in the graphical user interface, process stream data elements correlating to at least one pipe, wherein the process stream data elements comprise a plurality of material handling properties associated with a plurality of chemical constituents of a process stream.

15. The method of claim 13, further comprising:
monitoring and analyzing retrieved data for detection of data values exceeding a user-defined range bounded by a maximum value and a minimum value; and
generating an alert if the detected data values exceed the user-defined range.

* * * * *

UNITED STATES PATENT AND TRADEMARK OFFICE
CERTIFICATE OF CORRECTION

PATENT NO. : 9,811,251 B2
APPLICATION NO. : 14/594102
DATED : November 7, 2017
INVENTOR(S) : Shane Edward Kling Page 1 of 1

It is certified that error appears in the above-identified patent and that said Letters Patent is hereby corrected as shown below:

In the Claims

Column 11, Claim 3, Lines 65-66, delete the second occurrence of "at least one of the data managment systems".

Column 12, Claim 11, Line 63, after "graphical" add -- representation --.

Signed and Sealed this
Thirty-first Day of July, 2018

Andrei Iancu
*Director of the United States Patent and Trademark Office*